(12) United States Patent
Kitabata et al.

(10) Patent No.: US 12,535,777 B2
(45) Date of Patent: Jan. 27, 2026

(54) FREQUENCY CONTROL ASSIST DEVICE, FREQUENCY CONTROL DEVICE, AND RADIO DEVICE

(71) Applicant: Icom Incorporated, Osaka (JP)

(72) Inventors: Masanori Kitabata, Osaka (JP); Jyota Koyama, Osaka (JP); Sota Shimamoto, Osaka (JP)

(73) Assignee: ICOM INCORPORATED, Osaka (JP)

( * ) Notice: Subject to any disclaimer, the term of this patent is extended or adjusted under 35 U.S.C. 154(b) by 67 days.

(21) Appl. No.: 18/581,756

(22) Filed: Feb. 20, 2024

(65) Prior Publication Data

US 2024/0280944 A1 Aug. 22, 2024

(30) Foreign Application Priority Data

Feb. 21, 2023 (JP) ................................. 2023-025499

(51) Int. Cl.
*G04R 40/06* (2013.01)
(52) U.S. Cl.
CPC .................................. *G04R 40/06* (2013.01)
(58) Field of Classification Search
CPC ....................................................... G04R 40/06
See application file for complete search history.

(56) References Cited

U.S. PATENT DOCUMENTS

| 7,095,802 B1* | 8/2006 | Wardrop | H03J 1/0033 |
| | | | 375/295 |
| 2017/0016940 A1* | 1/2017 | Liu | G01R 21/00 |
| 2020/0052875 A1* | 2/2020 | Scarpa | G01S 19/14 |
| 2022/0050495 A1* | 2/2022 | Bismuth | G06F 1/12 |

FOREIGN PATENT DOCUMENTS

JP 2010141489 A 6/2010

* cited by examiner

*Primary Examiner* — Patrick O Neill
(74) *Attorney, Agent, or Firm* — McCarter & English, LLP; Dave S. Christensen (57) ABSTRACT

A frequency control assist device is configured to: calculate an average value of pulse numbers each of which is a pulse number of a reference signal generated by an oscillator in one cycle of a PPS signal generated based on a GPS signal, from a total of the pulse numbers counted for a time period whose length is a predetermined number times the one cycle, the average value being an average value of the pulse numbers each for the one cycle; and every time a deviation between a specified value of a reference frequency of the reference signal and the average value falls below a target value, reduce the target value from the current value and increase, from the current value, the predetermined number that specifies the time period for obtaining the total of the pulse numbers from which the average value is to be calculated by an averaging circuit.

4 Claims, 4 Drawing Sheets

FREQUENCY CONTROL ASSIST DEVICE, FREQUENCY CONTROL DEVICE, AND RADIO DEVICE

This Nonprovisional application claims priority under 35 U.S.C. § 119 on Patent Application No. 2023-025499 filed in Japan on Feb. 21, 2023, the entire contents of which are hereby incorporated by reference.

TECHNICAL FIELD

The present invention relates to, for example, a frequency control assist device that assists controlling a frequency with use of a pulse per second (PPS) signal obtained from a global positioning system (GPS).

BACKGROUND ART

Radio devices carry out transmission and reception on the basis of reference signals having specified frequencies. In such a frequency of a reference signal, an error from a specified value occurs due to, for example, aging of an oscillator for generating the reference signal. For example, Patent Literature 1 discloses correcting a reference signal on the basis of a PPS signal obtained from a GPS signal.

Normally, a PPS signal is an accurate signal having a one-second cycle that is synchronized with the coordinated universal time (UTC). However, the PPS signal may fail to be an accurate one-second cycle signal when an error occurs according to, for example, accuracy of a GPS receiver for receiving a GPS signal and generating a PPS signal and a deteriorated reception environment for a GPS signal, such as multipath. With use of such a PPS signal having an error, a frequency of a reference signal cannot be appropriately corrected.

In order to correct the frequency of a reference signal with use of such a PPS signal having an error, for example, leveling of the error is carried out by averaging the PPS signal within a certain time range. A specific process of the leveling includes: counting, for a cycle of a PPS signal, pulses of a reference signal outputted from an oscillator of a radio device; repeating the counting; and correcting the frequency in a manner so as to eliminate a deviation between an average value of the count values (the numbers of the pulses counted) for a plurality of the cycles and a specified value of the frequency.

CITATION LIST

Patent Literature

[Patent Literature 1]
Japanese Patent Application Publication Tokukai No. 2010-141489

SUMMARY OF INVENTION

Technical Problem

In a case where a radio device handles a frequency as high as 10 GHZ, an increase in error of a frequency of a reference signal increases, due to the error, a shift in the frequency thus handled. In this case, at a higher frequency, the shift is larger. Thus, accuracy of correcting the frequency needs to be improved so that the error falls within a range of approximately 1 ppb to 3 ppb.

Meanwhile, it was found, through actual measurement, that a theoretical error Ef (ppb) of a PPS signal is represented by the following equation: $Ef=150/Tg$. In the equation, the symbol "Tg" represents a gate time (sec). The gate time is a count time period in which while one cycle of a PPS signal is regarded as a basic unit, a counter counts pulses of a reference signal. The value "150" in the above equation is obtained through actual measurement.

Accordingly, in order to have a theoretical error Ef of 1 ppb, the gate time is required to be at least 150 seconds for the gate time. Further, in practice, even if a frequency is corrected on the basis of the average value of the count values obtained with use of such a gate time, the correction of the frequency would often result in failure, so that an error of the frequency falls outside a range that raises no practical problems. Specifically, although the frequency is corrected in such a manner as to eliminate a deviation between the frequency and a target value, it is difficult to cause the frequency to match the target value through one correction. This is because the error includes errors caused by: variation in control accuracy of devices; and a temperature state. Thus, a feedback control including such frequency correction with use of the 150-second gate time and error measurement needs to be repeated a plurality of times until the error falls within an allowable range. This causes a problem in which it takes long time to complete such a process.

It is an object of an aspect of the present invention to reduce time for correcting a frequency of a reference signal based on a PPS signal.

Solution to Problem

In order to solve the foregoing problem, a frequency control assist device in accordance with an aspect of the present invention includes: a count part configured to count pulse numbers of a reference signal which is generated by an oscillator in one cycle of a PPS signal generated on the basis of a GPS signal; an averaging part configured to calculate, from a total of the pulse numbers counted by the count part for a time period whose length is a predetermined number times the one cycle, an average value of the pulse numbers each for the one cycle; a detection part configured to detect a deviation between a specified value of a reference frequency of the reference signal and the average value; and a changing part configured to, every time the deviation falls below a target value, reduce the target value from a current value and increase, from the current value, the predetermined number that specifies the time period for obtaining the total of the pulse numbers from which the average value is to be calculated by the averaging part.

Advantageous Effects of Invention

An aspect of the present invention makes it possible to reduce time for correcting a frequency of a reference signal based on a PPS signal.

DESCRIPTION OF EMBODIMENTS

Embodiment

With reference to FIGS. 1 to 5, the following will describe an embodiment of the present invention.
<Hardware Configuration of Radio Device>

Figure 1:
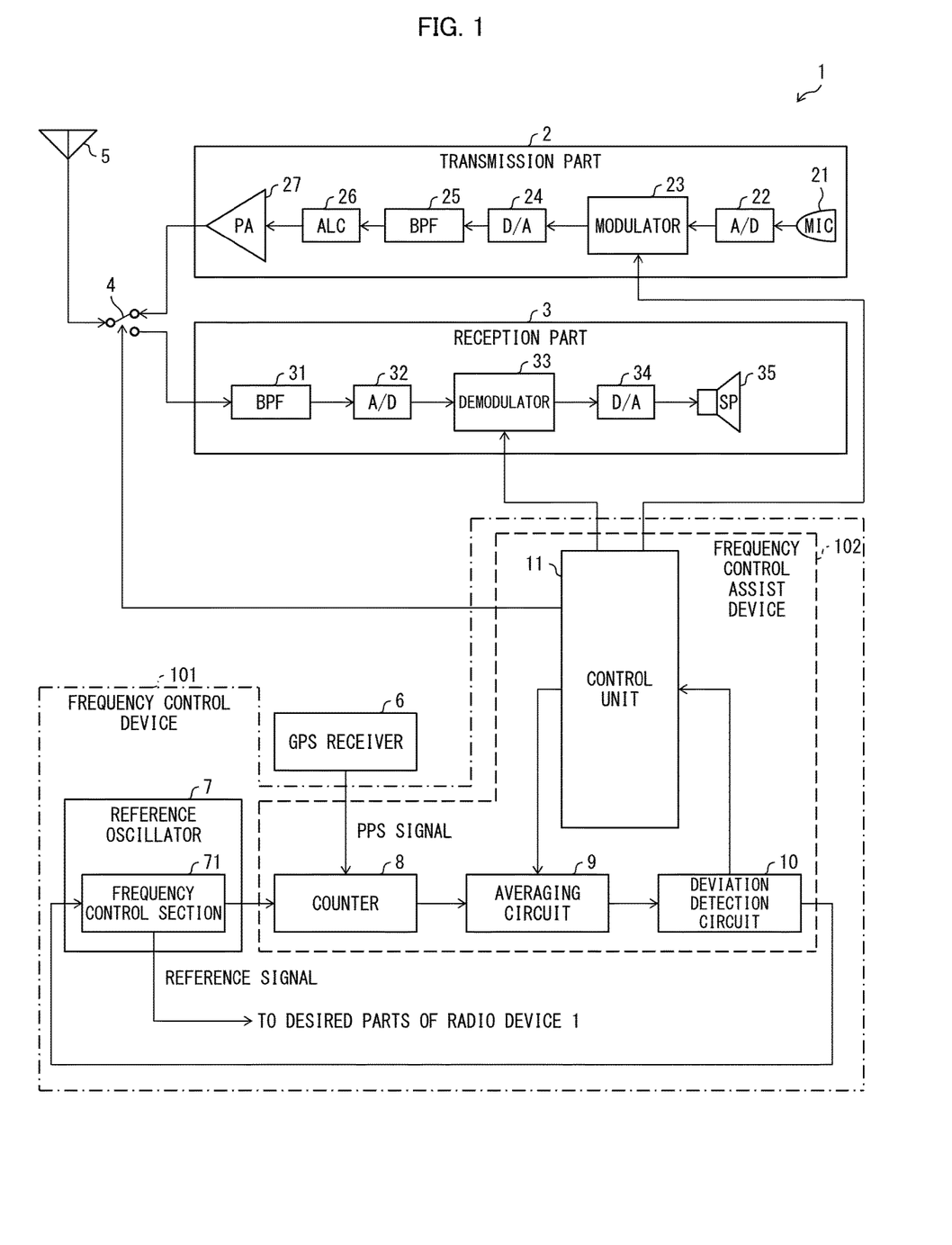
FIG. 1 is a block diagram illustrating a hardware configuration of a radio device in accordance with an embodiment of the present invention.
Figure 2:
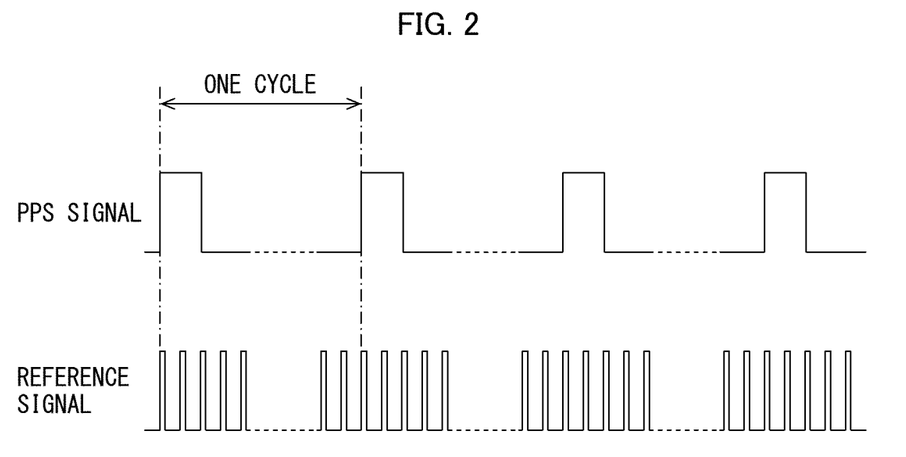
FIG. 2 is a waveform chart showing a relationship between a PPS signal outputted from a GPS receiver of the radio device and a reference signal outputted from a reference oscillator of the radio device.

FIG. 1 is a block diagram illustrating a hardware configuration of a radio device 1 in accordance with the present embodiment. FIG. 2 is a waveform chart showing a relationship between a PPS signal outputted from a global positioning system (GPS) receiver 6 of the radio device 1 and a reference signal outputted from a reference oscillator 7 of the radio device 1.

The radio device 1 can handle, for example, a frequency within a frequency band usable for transmitting/receiving an audio signal via armature radio and thus can be used as an armature radio device. As illustrated in FIG. 1, the radio device 1 includes a transmission part 2, a reception part 3, a transmission/reception switching circuit 4, an antenna 5, the GPS receiver 6, and a frequency control device 101.

The transmission part 2 is configured to carry out a transmission process of converting, into a transmission signal, a sound inputted into the transmission part 2. In order to carry out the transmission process, the transmission part 2 includes a microphone 21, an A/D converter 22, a modulator 23, a D/A converter 24, a band pass filter (BPF) 25, an automatic level control (ALC) circuit 26, and a power amplifier 27. In FIG. 1, the microphone 21 is abbreviated as MIC, the A/D converter 22 as A/D, the D/A converter 24 as D/A, the ALC circuit 26 as ALC, and the power amplifier 27 as PA.

In the transmission part 2, the A/D converter 22 converts, into a digital signal, an audio signal outputted from the microphone 21, and then the modulator 23 modulates the digital signal into a modulated signal through a predetermined modulation method. The D/A converter 24 converts the modulated signal into an analog signal, and then the BPF 25 transmits the modulated signal only in a predetermined band. After the modulated signal has passed through the BPF 25, the ALC circuit 26 limits an input level of the modulated signal into the power amplifier 27. An electric power of the modulated signal that has passed through the ALC circuit 26 is amplified by the power amplifier 27 so as to be large enough to be used for communication.

The transmission signal outputted from the transmission part 2 is outputted to the antenna 5 via the transmission/reception switching circuit 4. The antenna 5 radiates, as a radio wave, the transmission signal inputted into the antenna 5. Also, the antenna 5 outputs, to the transmission/reception switching circuit 4, a reception signal that the antenna 5 has received. The reception signal is inputted into the reception part 3 via the transmission/reception switching circuit 4.

The transmission/reception switching circuit 4 is configured to perform switching between the following connections: a connection between the antenna 5 and the transmission part 2; and a connection between the antenna 5 and the reception part 3. The transmission/reception switching circuit 4 is constituted by, for example, a semiconductor switch or a relay.

The reception part 3 is configured to carry out a reception process of converting, into a sound, a reception signal that the reception part 3 has received. In order to carry out the reception process, the reception part 3 includes a band pass filter (BPF) 31, an A/D converter 32, a demodulator 33, a D/A converter 34, and a speaker 35. In FIG. 1, the A/D converter 32 is abbreviated as A/D, the D/A converter 34 as D/A, and the speaker 35 as SP.

In the reception part 3, the BPF 31 limits a band of the reception signal inputted into the reception part 3, and then the A/D converter 32 converts the reception signal into a digital signal. Subsequently, the demodulator 33 demodulates the digital signal into an audio signal through a predetermined demodulation method. The audio signal from the demodulator 33 is converted into an analog signal by the D/A converter 34 and then is inputted into the speaker 35. The speaker 35 outputs a sound corresponding to the inputted signal.

The GPS receiver 6 is configured to generate a pulse per second (PPS) signal synchronized with the above-described UTC, on the basis of ranging radio waves (GPS signals) which are radiated from a plurality of satellites and are inputted into a GPS antenna (not illustrated) of the GPS receiver 6, and to output the PPS signal. The PPS signal is a so-called one-second signal, which has one pulse at one-second intervals (one-second cycle). As described above, the PPS signal includes errors due to, for example, deteriorated reception environment for a GPS signal, such as multipath, as well as accuracy of the GPS receiver 6.

Next, the following will describe the frequency control device 101. The frequency control device 101 is configured to control a frequency of a reference signal generated by the reference oscillator 7. The frequency control device 101 includes the reference oscillator 7 (oscillator) and frequency control assist device 102.

The reference oscillator 7 is configured to generate a reference signal having a reference frequency and output the reference signal to parts in need of the reference signal in the radio device 1. The frequency of the reference signal is divided so as to correspond to that of a destination part to which the reference signal is to be supplied, and then the reference signal is supplied to the destination part. The reference frequency normally takes a specified value but has an error from the specified value due to factors, such as temperature. The reference oscillator 7 includes a frequency control section 71 (control section) configured to control the reference frequency so as to reduce a deviation (described later) that is outputted as a voltage value from a deviation detection circuit 10. Such a reference oscillator 7 is constituted by an oven controlled crystal oscillator (OCXO), a voltage controlled crystal oscillator (VCXO), or the like.

The frequency control assist device 102 is configured to assist frequency control carried out by the frequency control device 101. The frequency control assist device 102 includes a counter 8 (count part), an averaging circuit 9 (averaging part), the deviation detection circuit 10 (detection part), and a control unit 11.

The counter 8 is configured to count pulses of a reference signal generated by the reference oscillator 7 for one cycle of a PPS signal, as illustrated in FIG. 2. Specifically, the counter 8 starts counting the pulses synchronously with a rising edge of the PPS signal and, synchronously with a subsequent rising edge of the PPS signal, stops counting the pulses and outputs the number of the pulses (pulse number) counted. In a case where the counter 8 counts the pulses successively for a plurality of cycles of the PPS signal, the counter 8, synchronously with a rising edge of the PPS signal, stops counting the pulses and simultaneously starts subsequent counting. Alternatively, the counter 8 may start and stop counting the pulses synchronously with a falling edge of the PPS signal.

The averaging circuit 9 is configured to calculate an average value of the pulse numbers each for one cycle of a PPS signal, from a total of the pulse numbers counted by the counter 8 in a time period whose length is a predetermined number N (where N is a natural number) times the one cycle of the PPS signal. The average value is assumed to be outputted as a pulse number per cycle of the PPS signal, i.e., per second and thus can be treated as frequency. The predetermined number is changed by the control unit 11.

The deviation detection circuit 10 is configured to detect a deviation between the specified value of the reference frequency and the average value outputted from the averaging circuit 9. Specifically, the deviation detection circuit 10 calculates the deviation of the frequency by subtracting the average value from the specified value and then outputs the deviation as a voltage. In a case where the deviation is a positive value, the average value is smaller than the specified value. In contrast, in a case where the deviation is a negative value, the average value is larger than the specified value. The frequency control section 71 of the reference oscillator 7 is configured to, in response to the positive deviation, perform control so as to increase the reference frequency and is configured to, in response to the negative deviation, perform control so as to reduce the reference frequency.

As described above, the radio device 1 uses the PPS signal in order to perform the control so as to cause the reference frequency to approach the specified value. Both the reference frequency and the PPS signal include errors. The error of the PPS signal is large in a case where the error in a short term is considered, e.g., in a case where the error in a period of one-second pulse length is considered. However, the error of the PPS signal is small in a case where the error in a long term is considered, e.g., in a case where an average value of pulses for a predetermined number of cycles is considered. Thus, in a case where the reference frequency is corrected on the basis of the deviation detected with use of the average value of the pulse numbers of the PPS signal, it is possible to accurately cause the reference frequency to approach the specified value.

The control unit 11 includes, although not illustrated, a central processing unit (CPU), a main memory, a storage memory, and the like and is configured to control targets of control in the radio device 1. The main memory is a memory used for carrying out various operations, such as calculation, and is constituted by, for example, a random access memory (RAM). The storage memory is a memory for storing data to be stored, such as calculation results, firmware, and other various data and is constituted by a writable and readable non-volatile memory, such as an electronically erasable and programmable read only memory (EEPROM).

The CPU controls the targets of control in the radio device 1 in accordance with the firmware. Specifically, the CPU, for example, controls a switching operation of the transmission/reception switching circuit 4 on the basis of an operation signal from a PTT switch (not illustrated) included in the radio device 1, and controls a display of a displaying part (not illustrated) included in the radio device 1. In addition, the CPU performs a process of changing, on the basis of the deviation detected by the deviation detection circuit 10, the above-described predetermined number N, which is the number of cycles for which the counter 8 counts the pulses of the reference signal. This process will be described later in detail.

<System Configuration of Radio Device>

Figure 3:
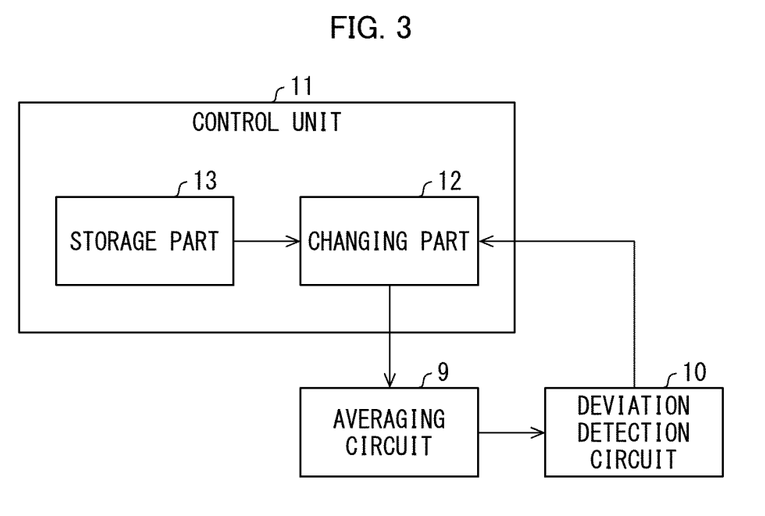
FIG. 3 is a block diagram illustrating a system configuration of main components of a frequency control assist device of the radio device.

FIG. 3 is a block diagram illustrating a system configuration of main components of the frequency control device 101.

As illustrated in FIG. 3, the control unit 11 includes a changing part 12 and a storage part 13.

The changing part 12 reduces a target value G from the current value every time the deviation detected by the deviation detection circuit 10 falls below the target value G. Further, every time the deviation falls below the target value G, the changing part 12 increases, from the current value, the predetermined number N that specifies a time period for obtaining the total of the pulse numbers from which the average value is to be calculated by the averaging circuit 9.

The target value G can take one of predetermined values different from each other. The default value of the target value G is the maximum value among the predetermined values. The predetermined number N can take one of respective values set so as to correspond to the target values G. Specifically, the predetermined number N is set such that a smaller predetermined number N corresponds to a larger target value G. Every time the deviation falls below the target value G, the changing part 12 changes the target value G to a value next smaller than the current value among the predetermined values and changes the predetermined number N to the number corresponding to the target value G after the above-described change of the target value G to the value next smaller than the current value.

As an example, the following will describe a case where the target value G and the predetermined number N are changed in three stages. In this case, the target value G can take one of three values including a first target value, a second target value, and a third target value. It is assumed that of the three values, the first target value is the largest, the second target value is the second largest, and the third target value is the smallest. In this case, the changing part 12 sets the first target value as the default value of the target value G. After that, when a deviation falls below the first target value, the changing part 12 changes the target value G to the second target value, which is next smaller than the first target value. After that, when the deviation falls below the second target value, the changing part 12 changes the target value G to the third target value, which is next smaller than the second target value.

Further, the number of values which the predetermined number N can take is three, that is, a first predetermined number, a second predetermined number, and a third predetermined number which correspond respectively to the first target value, the second target value, and the third target value. Of the three predetermined numbers, the first predetermined number is the smallest, the second predetermined number is the second smallest, and the third predetermined number is the largest. When the changing part 12 sets the target value G to the first target value, the changing part 12 sets the predetermined number N to the first predetermined number. When the changing part 12 changes the target value G to the second target value, the changing part 12 changes the predetermined number N to the second predetermined number. When the changing part 12 changes the target value G to the third target value, the changing part 12 changes the predetermined number N to the third predetermined number.

The changing part 12 sets the first target value and the first predetermined number, for example, in a default state of the radio device 1 at the time point when the radio device 1 is turned on, and, when the deviation falls below the first target value, sets the second target value and the second predetermined number. Then, when the deviation falls below the second target value from this state, the changing part 12 sets the third target value and the third predetermined number.

Note that it is needless to say that the number of the stages in which the target value G and the predetermined number N are changed is not limited to three.

The storage part 13 stores values which the target value G can take (for example, the above first target value, second target value, and third target value) and values which the predetermined number N can take (for example, the above first predetermined number, second predetermined number, and third predetermined number). The storage part 13 is constituted by, for example, the above-described EEPROM.

<Frequency Control Process by Control Unit>

Figure 4:
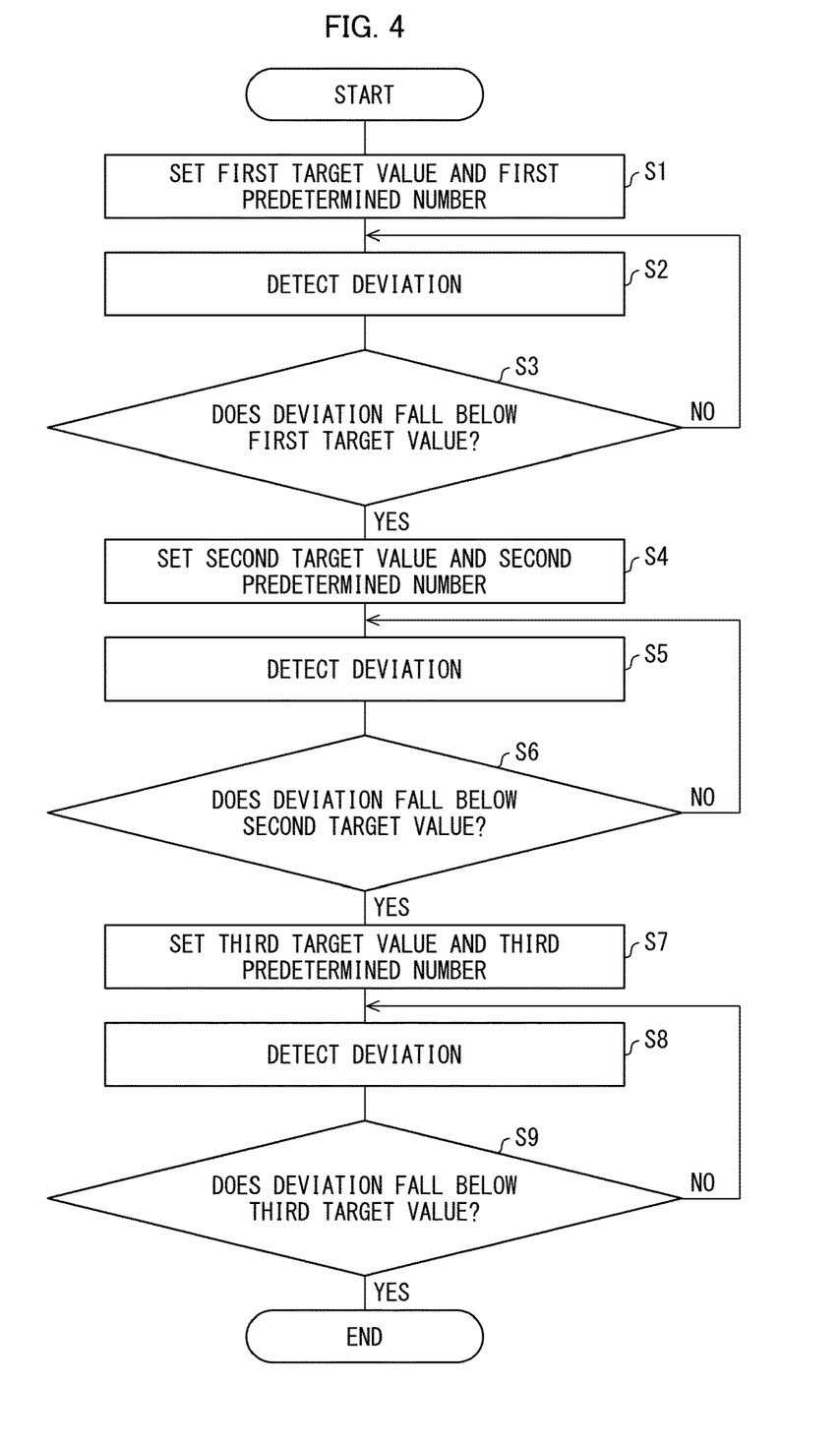
FIG. 4 is a flowchart showing a procedure of a process of correcting a reference frequency of the reference signal in the radio device.

FIG. 4 is a flowchart showing a procedure of a process of correcting a reference frequency of a reference signal in the radio device 1. The following will describe a frequency control process of a case where the target value and the predetermined number are changed in three stages as described above.

First, an error of a frequency will be described. The radio device 1 handles a frequency as high as 10 GHz. An error by 1 ppb relative to 10 GHz is 10 Hz. In a frequency modulation (FM) mode of armature radio, an error of approximately 10 Hz in the frequency due to fluctuation of a PPS signal has little impact. In addition, in a single side band (SSB) mode of armature radio, an error of the frequency is directly reflected in pitch of a sound, but an error of approximately 10 Hz has little impact. However, when the error increases to approximately 100 Hz, such an error has great impact. For example, in FT8 communication of armature radio, a shift in frequency as large as 100 Hz results in reception of a signal at a completely different channel. Thus, an error of the frequency needs to fall within a range of at most 2 or 3 ppb, preferably within a range of 1 ppb.

First, the radio device 1 is turned on, so that the control unit 11 is activated. Then, the changing part 12 reads out the first target value and the first predetermined number, from the storage part 13 and sets the first target value and the first predetermined number (step S1), as shown in FIG. 4. Here, as the first predetermined number, for example, 5 (equivalent to a gate time of 5 seconds) is set.

Subsequently, the deviation detection circuit 10 detects a deviation between a specified value of the reference frequency and an average value calculated by the averaging circuit 9 (step S2). Before the detection of the deviation, the counter 8 counts a pulse number of the reference signal from the reference oscillator 7, and the averaging circuit 9 calculates an average value of pulse numbers each for one cycle of a PPS signal by dividing, by the first predetermined number, a total of pulse numbers for a time period whose length is the first predetermined number N times the one cycle.

After the detection of the deviation, the changing part 12 determines whether the deviation falls below the first target value (step S3). Here, the first target value is set to, for example, 60 ppb. The theoretical error Ef (ppb) of the PPS signal is represented by the following equation, as described above.

$$Ef = 150/Tg$$

Therefore, in the case of Tg=5 (sec), Ef=±30 ppb.

In a case where the changing part 12 determines, in the step S3, that the deviation falls below the first target value (YES), the changing part 12 reads out the second target value and the second predetermined number, from the storage part 13 and sets the second target value and the second predetermined number (step S4). Accordingly, the changing part 12 changes the first target value to the second target value and changes the first predetermined number to the second predetermined number. Here, as the second predetermined number, for example, 80 (equivalent to a gate time of 80 seconds) is set.

In a case where the changing part 12 determines, in the step S3, that the deviation does not fall below the first target value (NO), the process returns to the step S2.

Subsequently, the deviation detection circuit 10 detects a deviation between the specified value of the reference frequency and an average value calculated by the averaging circuit 9 (step S5). Before the detection of the deviation, the averaging circuit 9 calculates the average value of pulse numbers each for the one cycle in a time period whose length is the second predetermined number N times the one cycle. In the step S5, the deviation detection circuit 10 calculates a deviation between the average number and the specified value.

After the detection of the deviation, the changing part 12 determines whether the deviation falls below the second target value (step S6). Here, the second target value is, for example, 4 ppb. In the case of Tg=80 (sec), Ef=+2 ppb.

In a case where the changing part 12 determines, in the step S6, that the deviation falls below the second target value (YES), the changing part 12 reads out the third target value and the third predetermined number, from the storage part 13 and sets the third target value and the third predetermined number (step S7). Accordingly, the changing part 12 changes the second target value to the third target value and changes the second predetermined number to the third predetermined number. Here, as the third predetermined number, for example, 150 (equivalent to a gate time of 150 seconds) is set.

In a case where the changing part 12 determines, in the step 6, that the deviation does not fall below the second target value (NO), the process returns to the step S5.

Subsequently, the deviation detection circuit 10 detects a deviation between the specified value of the reference frequency and an average value calculated by the averaging circuit 9 (step S8). Before the detection of the deviation, the averaging circuit 9 calculates an average value of pulse numbers each for the one cycle in a time period whose length is the third predetermined number N times the one period. In the step S8, the deviation detection circuit 10 calculates a deviation between the average number and the specified value.

After the detection of the deviation, the changing part 12 determines whether the deviation falls below the third target value (step S9). Here, the third target value is set to, for example, 2 ppb. In the case of Tg=150 (sec), Ef=+1 ppb.

In a case where the changing part 12 determines, in the step S9, that the deviation falls below the third target value (YES), the process ends. In a case where the changing part 12 determines, in the step S9, that the deviation does not fall below the third target value (NO), the process returns to the step S8.

Through such a process, the reference frequency of the reference signal is controlled so that an error of the reference frequency falls within a predetermined range.

After the process has ended, a series of the frequency control processes carried out by the counter 8, the averaging circuit 9, the deviation detection circuit 10, and the frequency control section 71 may be repeated in a state where the predetermined number N is set to the third predetermined number. This reduces the theoretical error Ef of the PPS signal to a value obtained by division by the number of times of the repetition. Therefore, it is possible to further improve accuracy of the reference frequency.

<Effect of Reducing Frequency Control Time>

Figure 5:
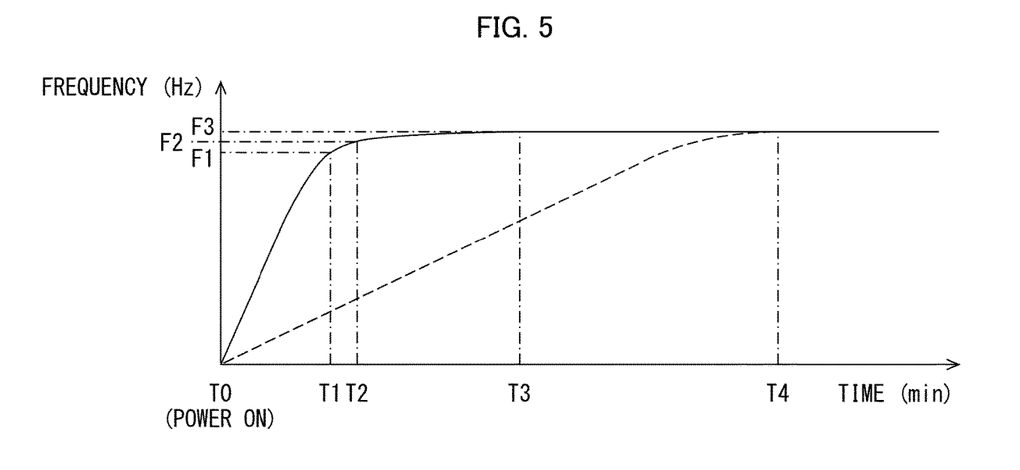
FIG. 5 is a graph showing both of (i) how the reference frequency in the radio device in accordance with the present embodiment of the present invention changes until the reference frequency is corrected to be a predetermined value and (ii) how a reference frequency in a radio device in accordance with Comparative Example changes until the reference frequency is corrected to be the predetermined value.

FIG. 5 is a graph showing both a change that occurs in a reference frequency of a reference signal in the radio device 1 in accordance with the present embodiment until the reference frequency in the radio device 1 is corrected to be a predetermined value and a change that occurs in a reference frequency in a radio device in accordance with Comparative Example until the reference frequency in the radio device is corrected to be the predetermined value. FIG. 5 shows the changes over time of the reference frequencies from a point in time T0 when the radio device 1 is turned on.

Here, it is assumed that, in the radio device 1, as the changing part 12 changes the target value G to a first target value, a second target value, and a third target value in this order, the changing part 12 changes the predetermined number N to the first predetermined number, the second predetermined number, and the third predetermined number in this order, as described above. Further, it is assumed that, in the radio device in accordance with Comparative Example, the changing part 12 is not included and the target value G and the predetermined number N are set respectively to the above-described third target value and the third predetermined number, which are maximum values.

As shown by a solid line in FIG. 5, in the radio device 1, respective processes of the above-described steps S2 and S3 are repeated a plurality of times in a state where the predetermined number N is set to the first predetermined number. As a result, after a period of time T1 from when the radio device 1 has been turned on, a reference frequency reaches a first frequency F1 having an error in a range within 60 ppb from a specified value of the reference frequency. After that, the above-described steps S5 and S6 are repeated a plurality of times in a state where the predetermined number N is the second predetermined number after having been changed to the second predetermined number. As a result, after a period of time T2 from when the radio device 1 has been turned on, the reference frequency reaches a second frequency F2 having an error in a range within 4 ppb from the specified value. Thus far, it takes approximately 5 minutes (T2 represents approximately 5 minutes) if the process proceeds smoothly. Then, respective processes of the above-described steps S8 and S9 are repeated in a state where the predetermined number N is the third predetermined number after having been changed to the third predetermined numbers. As a result, after a period of time T3 from when the radio device 1 has been turned on, the reference frequency reaches a third frequency F3 having a predetermined value having an error in a range within 2 ppb from the specified value. Thus far, it takes approximately 10 minutes to 15 minutes (T3 represents approximately 10 minutes to 15 minutes).

In contrast, the radio device in accordance with Comparative Example carries out a process equivalent to repetition of the above-described steps S8 and S9 in a state where the third target value and the third predetermined number are set from a point in time when the radio device is turned on. Thus, as shown by a broken line in FIG. 5, the reference frequency gradually increases and reaches the third frequency F3 after a period of time T4 has elapsed. The period of time T4 is significantly longer than the period of time T3.

As described above, the radio device 1 makes it possible to significantly reduce time that is required to control the reference frequency for causing an error of the reference frequency to fall within a target range, compared with the radio device in accordance with Comparative Example.

Effect of Embodiment

The frequency control device 101 in accordance with the present embodiment includes the counter 8, the averaging circuit 9, the deviation detection circuit 10, and the changing part 12. The changing part 12 is configured to, every time a deviation detected by the deviation detection circuit 10 falls below a target value G, reduce the target value G from the current value and increase, from the current value, the predetermined number N that specifies a range of the total of the pulse numbers from which an average value is to be calculated by the averaging circuit 9.

According to the above configuration, the predetermined number N is set at first to a small value, so that the reference frequency is controlled roughly. Further, as the target value G is changed to a smaller value, the predetermined number N is increased every time the deviation falls below the target value G. This allows the reference frequency to be controlled more finely. This makes it possible to significantly reduce time that is required to control the reference frequency for causing an error of the reference frequency to fall within a target range, compared with the case where the reference frequency is controlled, from the beginning, on the basis of the maximum predetermined number N.

The target value G can take one of predetermined values different from each other, and the default value of the target value G is the maximum value among the predetermined values. The predetermined number N can take one of respective values set so as to correspond to the target values G. It is preferable that, every time the deviation falls below the target value G, the changing part 12 changes the target value G to a value next smaller than the current value among the predetermined values and changes the predetermined number N to the number corresponding to the target value G after the above-described change of the target value G to the value next smaller than the current value.

According to the above configuration, setting the predetermined values for the target value G as appropriate makes it possible to improve an effect of reducing the time for controlling the reference frequency.

The frequency control device 101 includes the reference oscillator 7. The reference oscillator 7 includes the frequency control section 71 configured to control a reference frequency so as to reduce a deviation detected by the deviation detection circuit 10 of the frequency control assist device 102.

The radio device 1 includes the frequency control device 101. This makes it possible to efficiently control reference frequencies in various devices that handle reference signals having high frequencies, as well as, needless to say, reference frequencies in radio devices including an armature radio device that can handle a high frequency. Therefore, it is possible to apply an embodiment of the present invention to, for example, radio communication technologies that use reference signals having high frequencies as well as to armature radio devices.

[Software Implementation Example]

Functions of the frequency control assist device 102 (hereinafter referred to as a "device") can be realized by a program for causing a computer to function as the device. The program causes the computer to function as control blocks (in particular, the changing part 12 included in the control unit 11) of the device.

In this case, the device includes, as hardware for executing the program, the at least one CPU described above and the at least one main memory described above. The functions described in the above embodiments are realized by executing the program with use of the CPU and the main memory.

The program can be stored in one or more non-transitory computer-readable storage media. The one or more storage media may or may not be included in the device. In the latter case, the program can be supplied to or made available to the device via any wired or wireless transmission medium.

Further, part or all of the functions of the control blocks can also be realized by a logic circuit. For example, an integrated circuit in which a logic circuit functioning as the control blocks is formed is included in the scope of the present invention. Apart from the above, the functions of the control blocks can also be realized, for example, by a quantum computer.

[Supplementary Note]

The present invention is not limited to the above embodiments, but can be altered by a skilled person in the art within the scope of the claims. The present invention also encompasses, in its technical scope, any embodiment derived by combining technical means disclosed in differing embodiments.

REFERENCE SIGNS LIST

1 Radio device
7 Reference oscillator (oscillator)
8 Counter (count part)
9 Averaging circuit (averaging part)
10 Deviation detection circuit (detection part)
12 Changing part
71 Frequency control section (control section)
101 Frequency control device
102 Frequency control assist device

The invention claimed is:

1. A frequency control assist device comprising:
   a count part configured to count pulse numbers of a reference signal which is generated by an oscillator in one cycle of a Pulse Per Second (PPS) signal generated on the basis of ranging radio waves that are radiated from a plurality of satellites;
   an averaging part configured to calculate, from a total of the pulse numbers counted by the count part for a time period whose length is a predetermined number times the one cycle, an average value of the pulse numbers per cycle in the time period;
   a detection part configured to detect a deviation between a specified value of a reference frequency of the reference signal and the average value; and
   a changing part configured to, every time the deviation falls below a target deviation value, reduce the target deviation value from a current target deviation value and increase, from a current predetermined number value, the predetermined number that specifies the time period for obtaining the total of the pulse numbers from which the average value is to be calculated by the averaging part.

2. The frequency control assist device according to claim 1, wherein:
   the target deviation value takes one of multiple predetermined deviation values different from each other;
   a default value of the target deviation value is a maximum value among the multiple predetermined deviation values;
   the predetermined number value takes one of a set of respective number values that correspond to the multiple predetermined deviation values; and
   the changing part is configured to, every time the deviation falls below the target deviation value, change the target deviation value to a predetermined deviation value next smaller than the current target deviation value among the multiple predetermined deviation values and change the predetermined number to a number value corresponding to the predetermined deviation value next smaller than the current target deviation value among the multiple predetermined deviation values.

3. A frequency control device comprising:
   the oscillator configured to generate the reference signal; and
   a control section configured to control the reference frequency so as to reduce the deviation detected by the frequency control assist device according to claim 1.

4. A radio device comprising the frequency control device according to claim 3.

* * * * *